(12) United States Patent
Kanbe (10) Patent No.: US 12,332,626 B2
(45) Date of Patent: Jun. 17, 2025

(54) ACCURACY ANALYSIS SYSTEM FOR MACHINE TOOL

(71) Applicant: OKUMA CORPORATION, Niwa-Gun (JP)

(72) Inventor: Reiji Kanbe, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 360 days.

(21) Appl. No.: 17/821,873

(22) Filed: Aug. 24, 2022

(65) Prior Publication Data

US 2023/0076585 A1 Mar. 9, 2023

(30) Foreign Application Priority Data

Sep. 3, 2021 (JP) .................................. 2021-144183

(51) Int. Cl.
*G05B 19/404* (2006.01)
*B23Q 17/22* (2006.01)

(52) U.S. Cl.
CPC ........... *G05B 19/404* (2013.01); *B23Q 17/22* (2013.01)

(58) Field of Classification Search
CPC ...... B23Q 15/24; B23Q 17/007; B23Q 17/22; G05B 19/404
See application file for complete search history.

(56) References Cited

U.S. PATENT DOCUMENTS

| 2002/0003416 A1* | 1/2002 | Sagasaki | G05B 19/414 318/600 |
| 2003/0056147 A1* | 3/2003 | Yutkowitz | G05B 11/28 714/25 |
| 2015/0127131 A1* | 5/2015 | Herrman | G06Q 30/0283 700/98 |
| 2022/0206456 A1* | 6/2022 | Mori | G05B 19/4065 |

FOREIGN PATENT DOCUMENTS

| JP | 2017-027360 A | 2/2017 |
| JP | 6738466 B2 | 8/2020 |
| JP | 2021-009437 A | 1/2021 |

OTHER PUBLICATIONS

Japanese Office Action (with English translation) dated Dec. 3, 2024 (Application No. 2021-144183).

* cited by examiner

*Primary Examiner* — Tameem D Siddiquee
(74) *Attorney, Agent, or Firm* — BURR PATENT LAW, PLLC (57) ABSTRACT

An accuracy analysis system for a machine tool includes: a control unit, a data server, a data communication unit, a data analyzer, a corrected machine accuracy calculation unit, and a data display unit. The control unit stores preliminarily obtained accuracy data regarding a machine accuracy, compensation data for compensating for an error, and machine information. The data communication unit transmits the accuracy data, the compensation data, and the machine information to the data server. The data analyzer uses the accuracy data and the compensation data in the data server to obtain a compensation data correction value as a correction value of the compensation data and expected accuracy data when the compensation data correction value is applied. The corrected machine accuracy calculation unit calculates a post-correction machine accuracy from the expected accuracy data. The data display unit displays the post-correction machine accuracy calculated by the corrected machine accuracy calculation unit.

7 Claims, 7 Drawing Sheets

ACCURACY ANALYSIS SYSTEM FOR MACHINE TOOL

CROSS REFERENCE TO RELATED APPLICATION

This application claims the benefit of Japanese Patent Application Number 2021-144183 filed on Sep. 3, 2021, the entirety of which is incorporated by reference.

FIELD OF THE INVENTION

The disclosure relates to a system for analyzing a machine accuracy of a machine tool.

BACKGROUND OF THE INVENTION

A machine tool often has a function to ensure a machine accuracy, such as a positioning accuracy, a straightness, and a squareness and compensate for a thermal displacement, and the like for obtaining a high accuracy. The machine accuracy is reduced by various causes, such as a temperature environment of a factory, an abrasion of a machine element, and a deformation of a floor.

When the machine accuracy is reduced, it is necessary to measure the machine accuracy, adjust compensation data of each compensation function, and perform an adjustment work of the machine accuracy, such as a machine leveling. It is difficult for a user of a machine tool to correct compensation data of each compensation function and perform an adjustment work of a machine accuracy, and generally, a request is made to a manufacturer or the like, and a serviceperson or an engineer familiar with the machine tool visits the user to measure the machine accuracy and perform the correction and the adjustment work.

As a method for the adjustment without the serviceperson or the like of the machine tool visiting the user, JP 6738466 B discloses a technique of calculating a machine accuracy to adjust compensation data by using measurement data and maintenance information by a measuring device installed to a machine tool.

In a case where a deterioration in precision of a workpiece is concerned, a user requests the adjustment of a machine accuracy. However, the accuracy of a workpiece includes factors, such as a process condition and a tool, in addition to the machine accuracy, and when the accuracy of the workpiece is reduced, whether the machine accuracy is reduced or not is often not found. Therefore, a serviceperson or the like of a machine tool measures the machine accuracy and performs an analysis at first, and subsequently, determines whether to perform the adjustment of the machine accuracy or not. As a result of the measurement and the analysis, when the machine accuracy is not reduced, or when it is determined that the machine accuracy is not improved regardless of correcting the compensation data, the time and the cost used for the measurement and the analysis of the machine accuracy are wasted.

JP 6738466 B does not disclose confirmation means for the machine accuracy. Therefore, the improvement of the machine accuracy when the compensation data is corrected cannot be confirmed.

Meanwhile, for correcting the compensation data, measuring the machine accuracy is necessary. However, since the measurement of the machine accuracy is performed in a state where the machining of the machine is stopped, the amount of measurable data is often small. Therefore, since a sufficient analysis cannot be performed because of the small amount of the measurement data, the reliability of the correction value of the compensation data is reduced.

Therefore, it is an object of the disclosure to provide an accuracy analysis system for a machine tool that enables a user to confirm a reduction degree of a machine accuracy and the machine accuracy after correcting compensation data to perform the correction of the compensation data and request an adjustment work of the machine accuracy.

It is another object of the disclosure to provide an accuracy analysis system for a machine tool that enables enhancing a reliability of a correction value of compensation data by performing an analysis using accuracy data of a plurality of machine tools including accuracy data of machine information highly correlated to machine information on a machine tool to be subjected to an analysis of a machine accuracy.

SUMMARY OF THE INVENTION

In order to achieve the above-described object, there is provided an accuracy analysis system for a machine tool according to one aspect of the disclosure. The accuracy analysis system for a machine tool includes a control unit, a data server, a data communication unit, a data analyzer, a corrected machine accuracy calculation unit, and a data display unit. The control unit stores preliminarily obtained accuracy data regarding a machine accuracy of the machine tool, compensation data for compensating for an error based on the accuracy data, and machine information as information regarding the machine tool. The data server stores the accuracy data, the compensation data, and the machine information. The data communication unit transmits the accuracy data, the compensation data, and the machine information in the control unit to the data server. The data analyzer uses the accuracy data and the compensation data in the data server to obtain a compensation data correction value as a correction value of the compensation data and expected accuracy data when the compensation data correction value is applied. The corrected machine accuracy calculation unit calculates a post-correction machine accuracy from the expected accuracy data. The data display unit displays the post-correction machine accuracy calculated by the corrected machine accuracy calculation unit.

In another aspect of the disclosure, which is in the above configuration, the data server stores the accuracy data, the compensation data, and the machine information of a plurality of machine tools, the data analyzer includes a machine information comparator that compares the machine information of the plurality of machine tools in the data server with one another, and when obtaining the compensation data correction value and the expected accuracy data of a predetermined one of the machine tools, the machine information comparator obtains the compensation data correction value and the expected accuracy data of the predetermined one of the machine tools by using the compensation data and the accuracy data of another one of the machine tools having the machine information determined to be highly correlated to the machine information of the predetermined one of the machine tools.

In another aspect of the disclosure, which is in the above configuration, the data display unit displays at least one of a graph indicating the post-correction machine accuracy calculated by the corrected machine accuracy calculation unit, a quality determination result of the post-correction machine accuracy, an effectivity of the compensation data correction value, and a necessity of a machine accuracy adjustment work.

In another aspect of the disclosure, which is in the above configuration, the accuracy analysis system for a machine tool further includes a machine accuracy calculation unit that calculates a machine accuracy from the accuracy data of the control unit. The data communication unit further includes a second data display unit that displays the machine accuracy calculated by the machine accuracy calculation unit and a communication execution selection unit that selects whether to perform a transmission to the data server.

In another aspect of the disclosure, which is in the above configuration, the second data display unit displays at least one of a graph indicating the machine accuracy calculated by the machine accuracy calculation unit, a quality determination result of the machine accuracy, and a necessity of a machine accuracy correction.

In another aspect of the disclosure, which is in the above configuration, the communication execution selection unit includes a determination unit that automatically determines whether to perform the transmission to the data server based on the machine accuracy calculated by the machine accuracy calculation unit.

In another aspect of the disclosure, which is in the above configuration, the accuracy analysis system for a machine tool further includes a second data communication unit that transmits the compensation data correction value and the expected accuracy data from the data analyzer to the control unit. The second data communication unit includes a second communication execution selection unit that selects whether to perform the transmission from the data analyzer to the control unit.

In another aspect of the disclosure, which is in the above configuration, the second communication execution selection unit includes a second determination unit that automatically determines whether to perform the transmission to the control unit based on the post-correction machine accuracy calculated by the corrected machine accuracy calculation unit.

In another aspect of the disclosure, which is in the above configuration, the accuracy data of the control unit includes a measurement position, a command position, and temperatures at a predetermined portion of the machine tool in a preliminarily set machine operation.

In another aspect of the disclosure, which is in the above configuration, the measurement position is a position of an object obtained by a position measurement sensor or a position of a distal end of a tool obtained by using a tool sensor.

In another aspect of the disclosure, which is in the above configuration, the accuracy analysis system for a machine tool further includes an accuracy adjustment work request unit and an accuracy adjustment acceptance unit. The accuracy adjustment work request unit is configured to request an accuracy adjustment work. The accuracy adjustment acceptance unit determines adjustment work possible dates based on the request of the accuracy adjustment work from the accuracy adjustment work request unit, and indicates the adjustment work possible dates to the accuracy adjustment work request unit. The accuracy adjustment work request unit includes a reservation unit configured to select an accuracy adjustment work date from the adjustment work possible dates and make a reservation.

The disclosure enables the user to confirm the current machine accuracy and the machine accuracy after adjusting the compensation data, thereby eliminating the time and the cost used for the unnecessary adjustment of the machine accuracy.

Especially, according to the other aspect including the machine information comparator, in addition to the above-described effect, since the analysis is performed including the data of the machine information highly correlated to the machine information on the machine tool to be subjected to the analysis of the machine accuracy, the reliability of the compensation data correction value can be enhanced even when the amount of data of the target machine tool is small.

DETAILED DESCRIPTION OF THE INVENTION

The following describes embodiments of the disclosure based on the drawings.

Figure 1A:
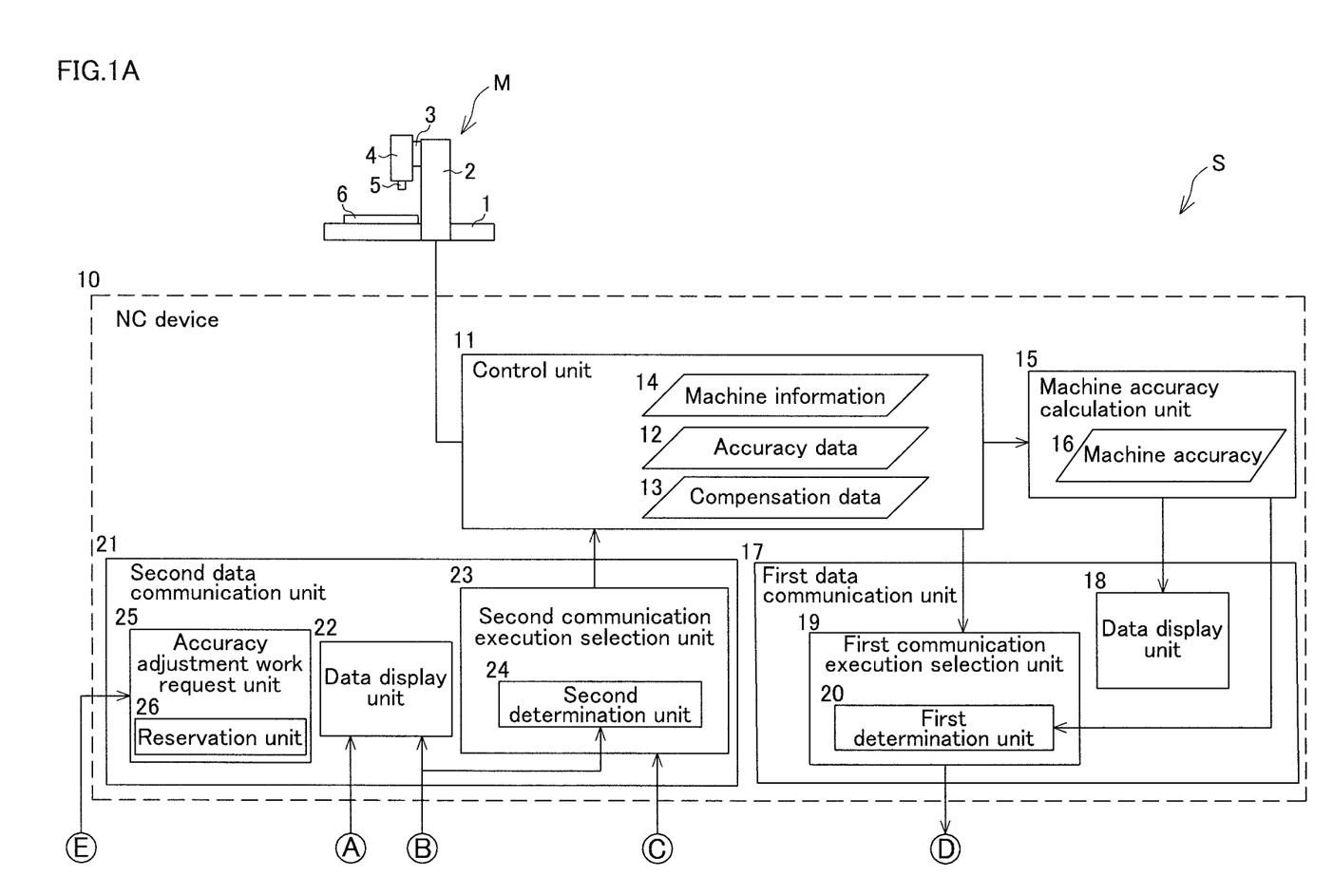
FIGS. 1A and 1B are a schematic diagram of an accuracy analysis system for a double column machining center.
Figure 1B:
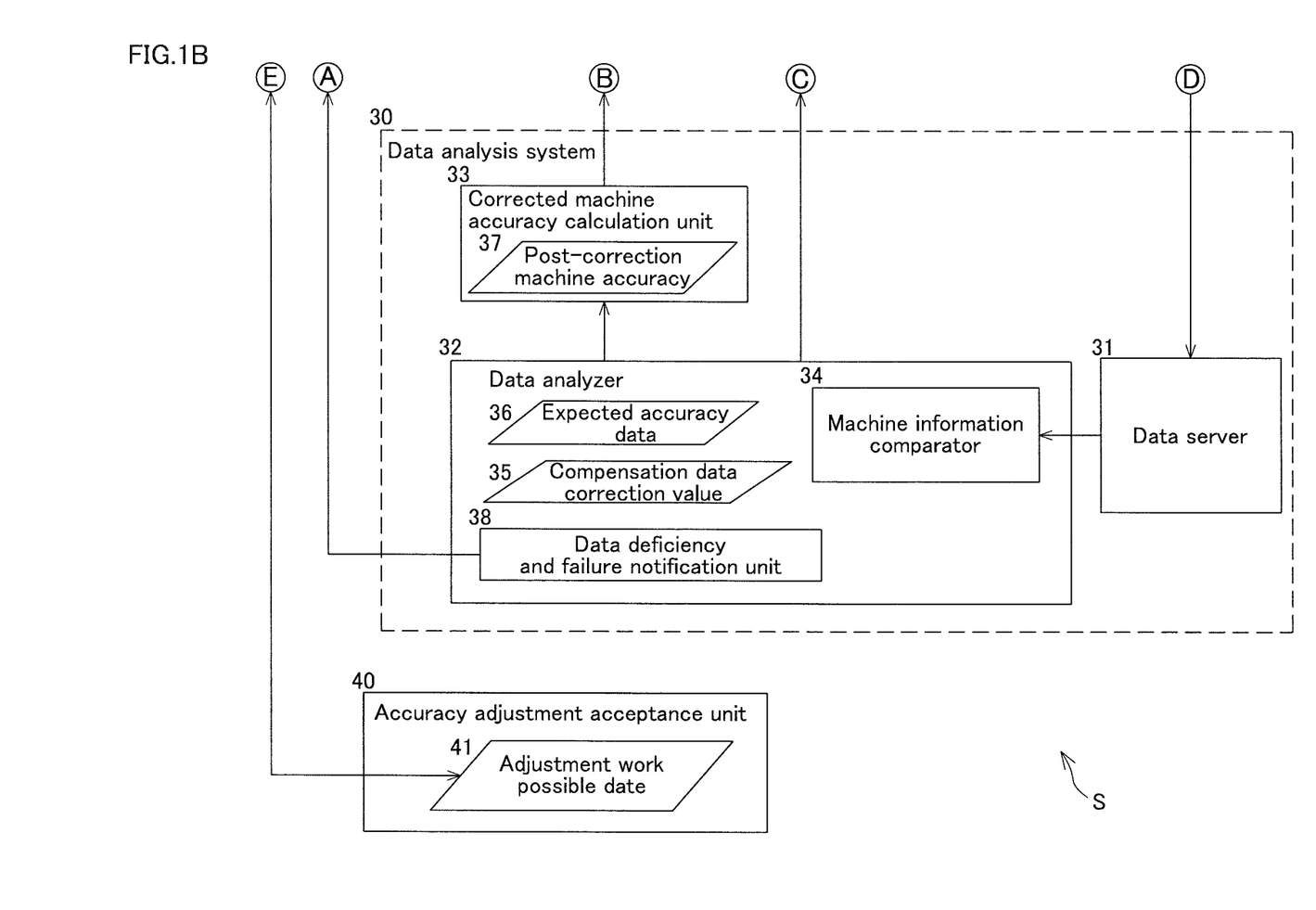

FIGS. 1A and 1B are a schematic diagram of an accuracy analysis system S for a double column machining center M as an example of a machine tool.

First, in the double column machining center M, columns 2 are fixedly disposed on both side surfaces of a bed 1 (in the depth direction of paper surface), a crossrail (not illustrated) is fixedly disposed between the columns 2, and a saddle 3 is installed on the crossrail movably in a Y-axis direction that is the depth direction of the paper surface. A spindle head 4 is installed on the saddle 3 movably in a Z-axis direction as an up-down direction, and a main spindle 5 is rotatably secured to the spindle head 4. A table 6 is placed on the bed 1 movably in an X-axis direction as a width direction parallel to the paper surface. A position in the X-axis direction of the table 6 is determined by a scale (not illustrated) installed to the bed 1 and a scale detector (not illustrated) secured to the table 6. Temperature sensors (not illustrated) are installed to respective units of the machine.

Feed controls in the respective axial directions are performed to the saddle 3, the spindle head 4, and the table 6 based on a machining program stored in an NC device 10, and a machining is performed by relatively moving the main spindle 5 with respect to a workpiece on the table 6.

The accuracy analysis system S includes a control unit 11, a machine accuracy calculation unit 15, a first data communication unit 17 (data communication unit), a second data communication unit 21 (second data communication unit), a data analysis system 30, and an accuracy adjustment acceptance unit 40. The control unit 11, the machine accuracy calculation unit 15, the first data communication unit 17, and the second data communication unit 21 are disposed in the NC device 10 of the double column machining center M. The data analysis system 30 and the accuracy adjustment acceptance unit 40 are installed in a manufacturer of a machine tool, an office of an accuracy adjustment worker, and the like.

However, the machine accuracy calculation unit 15, the first data communication unit 17, and the second data communication unit 21 excluding the control unit 11 of the NC device 10 may be installed in a factory as external units independent of the NC device 10.

The data analysis system 30 may be installed to the double column machining center M.

An analysis of a machine accuracy by the accuracy analysis system S will be described with a positioning accuracy of the table 6 in the X-axis direction as an example of the machine accuracy.

Figure 5:
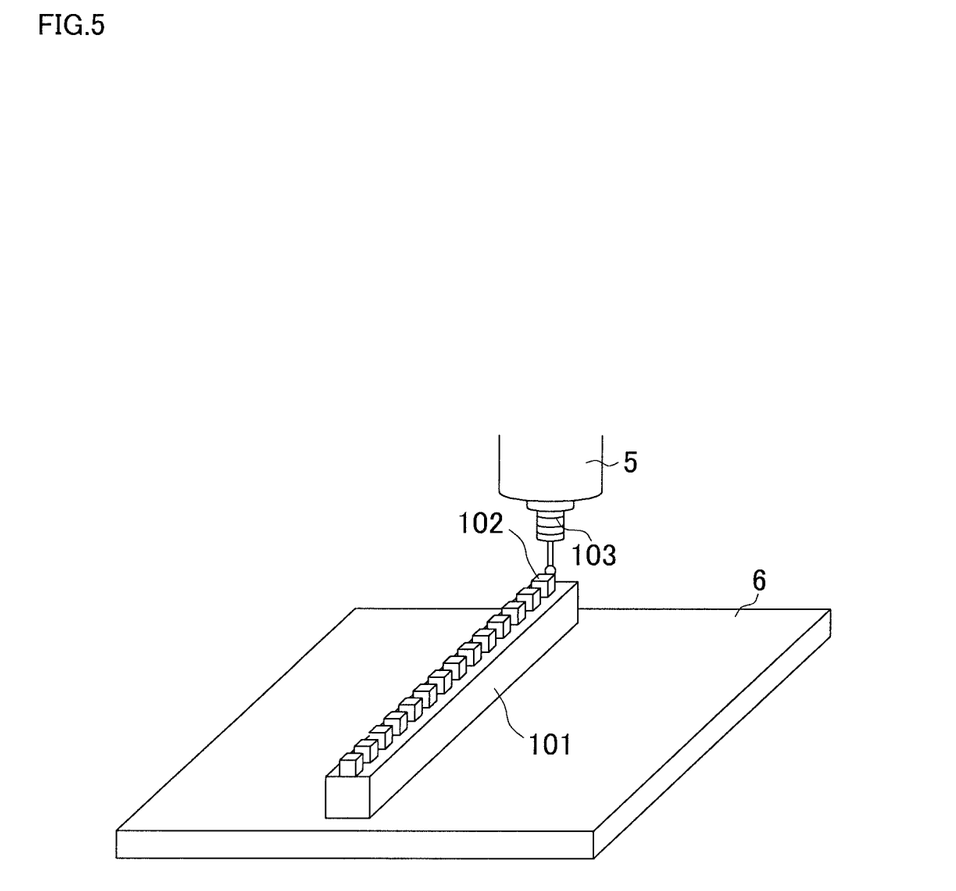
FIG. 5 illustrates an example of using a position measurement sensor.

First, a measurement method of the positioning accuracy in the X-axis direction is illustrated in FIG. 5. A master gauge 101 is a gauge having already-known inter-block distances of a plurality of blocks 102, and installed on an upper surface of the table 6. A touch probe 103 as a position measurement sensor is attached to the main spindle 5, the X-axis is moved so as to bring the touch probe 103 close to the blocks 102 of the master gauge 101, and obtains an X-axis coordinate at a time point at which a stylus of the touch probe 103 contacts the block 102 and a trigger signal is transmitted or a time point at which a signal delay is considered. The measurement can be performed by preparing a measurement program in advance, installing the master gauge 101, and executing the program.

The measurement result and temperature information of the temperature sensors installed to the double column machining center M are stored in a storage unit of the control unit 11 of the NC device 10 as accuracy data 12. At the same time, the storage unit stores compensation data 13 of each error compensation, such as a pitch compensation and a thermal displacement compensation, at the time, and machine information 14 including a model name, a serial number, date and time of accuracy data acquisition, temperature information of the factory, and the like of the double column machining center M.

The machine accuracy calculation unit 15 calculates a machine accuracy 16 from the data stored in the control unit 11. A user can confirm the calculated machine accuracy 16 by a data display unit 18 (second data display unit) disposed to the first data communication unit 17.

Figure 2:
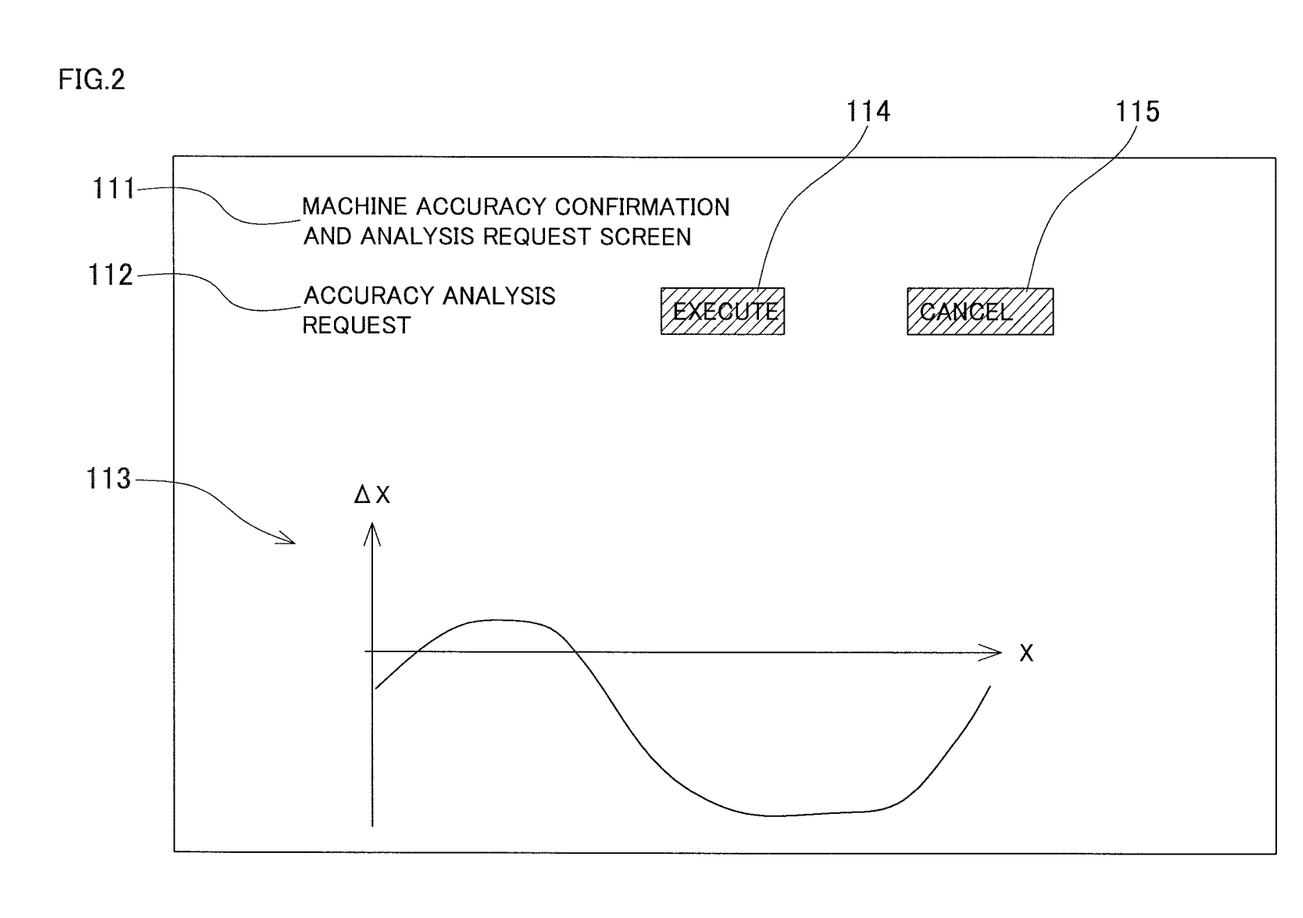
FIG. 2 illustrates an example of a machine accuracy confirmation and analysis request screen.

FIG. 2 illustrates an example of a machine accuracy confirmation and analysis request screen 111 indicating the positioning accuracy of the X-axis as the machine accuracy 16. The horizontal axis of a graph 113 indicates an X-axis command coordinate value obtained from the respective inter-block distances of the blocks 102. The vertical axis of the graph 113 indicates the positioning accuracy as a difference between an X-axis measured coordinate value and the X-axis command coordinate value when the touch probe 103 contacts the block 102 relative to the X-axis command coordinate value.

The user confirms the positioning accuracy indicated by the graph 113, and presses an execution button 114 as a first communication execution selection unit 19 (communication execution selection unit) in a column of an accuracy analysis request 112 when the user wants to request the accuracy analysis. In a case of cancel, the user presses a cancel button 115.

By the press operation of the execution button 114, the accuracy data 12, the compensation data 13, and the machine information 14 of the control unit 11 are transmitted to a data server 31 disposed in the external data analysis system 30 via the first data communication unit 17. Instead of the graph 113, or together with the graph 113, at least one of a message indicating the quality of the machine accuracy 16 and a message indicating the necessity of the machine accuracy analysis may be displayed. A first determination unit 20 (determination unit) disposed in the first data communication unit 17 may be configured to automatically determine the necessity of the accuracy analysis based on the machine accuracy 16, and transmit the data to the data server 31 to perform the analysis request when the accuracy analysis is determined to be necessary. With the first determination unit 20, the necessity of the accuracy analysis can be determined in the machine side, thus allowing to support the automatization.

The data server 31 stores accuracy data, compensation data, and machine information of a plurality of double column machining centers transmitted by the similar method. The data analysis system 30 includes a data analyzer 32 and a corrected machine accuracy calculation unit 33.

The data analyzer 32 analyzes a correction value of the compensation data for ensuring the positioning accuracy using the data in the data server 31. The analysis method includes a machine computation using AI or the like and an analysis by an engineer. As the data used for the analysis, in addition to the accuracy data 12, the compensation data 13, and the machine information 14 of the double column machining center M, the accuracy data and the compensation data of another double column machining center are used when a machine information comparator 34 compares the machine information of other double column machining centers stored in the data server 31 with the machine information 14 of the double column machining center M, and the other double column machining center has the machine information highly correlated to the machine information 14.

The data analyzer 32 creates expected accuracy data 36 using a compensation data correction value 35.

The corrected machine accuracy calculation unit 33 creates a post-correction machine accuracy 37 from the expected accuracy data 36 (in this case, corrected positioning accuracy when using the compensation data correction value 35). The post-correction machine accuracy 37 is transmitted to the second data communication unit 21, and can be confirmed by a data display unit 22 of the second data communication unit 21.

Figure 3:
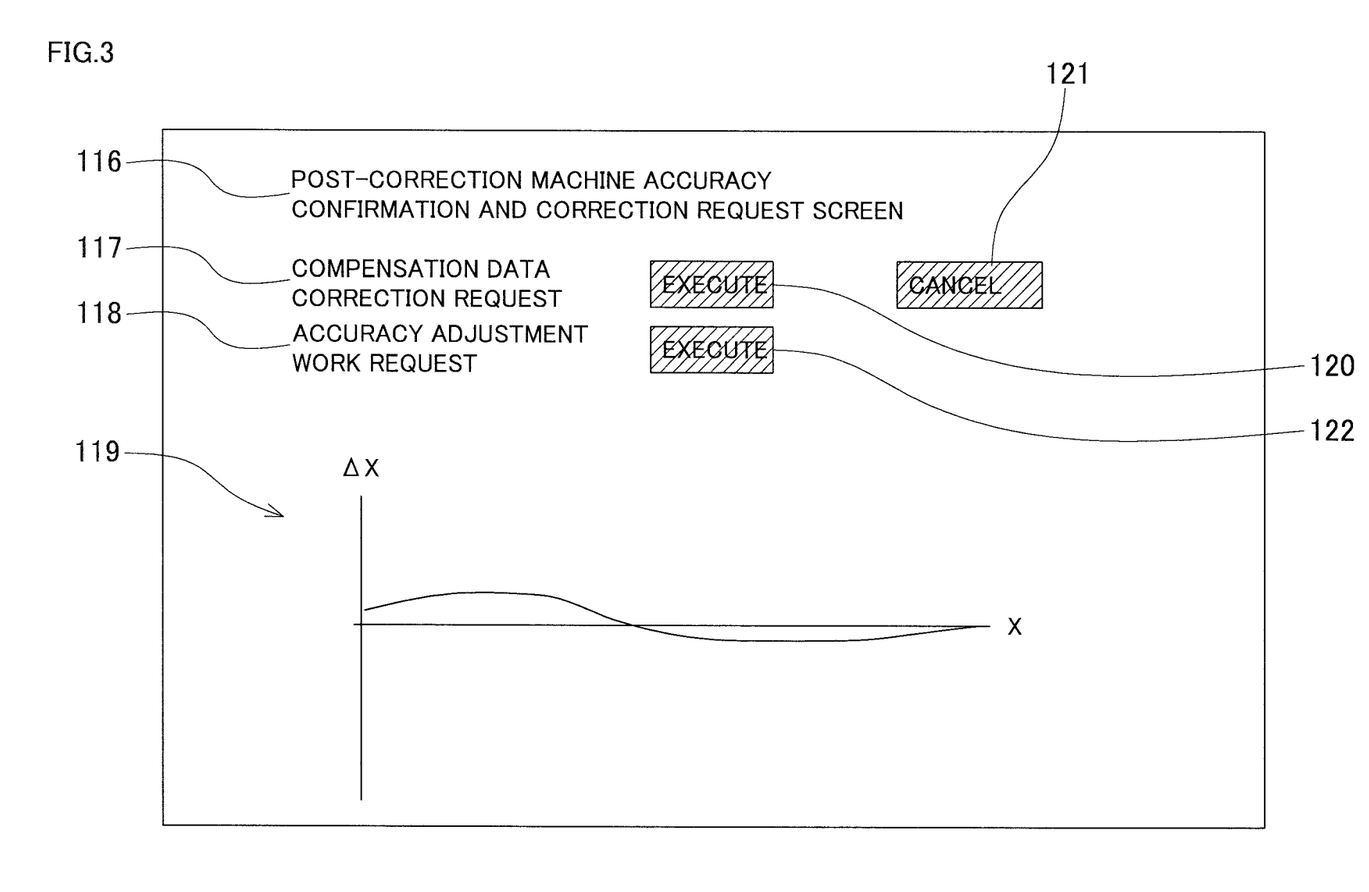
FIG. 3 illustrates an example of a post-correction machine accuracy confirmation and correction request screen.

FIG. 3 illustrates an example of a post-correction machine accuracy confirmation and correction request screen 116 indicating the corrected positioning accuracy of the X-axis as the post-correction machine accuracy 37. The horizontal axis of a graph 119 indicates the X-axis command coordinate value, and a vertical axis indicates a calculated value of the positioning accuracy when the compensation data correction value is applied. The user compares the positioning accuracy before the correction indicated by the graph 113 of FIG. 2 with the positioning accuracy after the correction indicated by the graph 119 of FIG. 3, and presses an execution button 120 as a second communication execution selection unit 23 (second communication execution selection unit) in a column of a compensation data correction request 117 when the user wants to apply the compensation data correction value 35. In a case of cancel, the user presses a cancel button 121.

By the press operation of the execution button 120, the compensation data correction value 35 of the data analyzer 32 is transmitted to the control unit 11 via the second data communication unit 21, and the compensation data 13 is changed by the control unit 11.

Instead of the graph 119, or together with the graph 119, at least one of a message indicating the quality of the post-correction machine accuracy 37, a message indicating the effectivity of the machine accuracy correction and a message indicating the necessity of the machine accuracy adjustment work may be displayed. A second determination unit 24 (second determination unit) disposed in the second communication execution selection unit 23 may be configured to automatically determine the necessity of applying the compensation data correction value 35 from the post-correction machine accuracy 37, and transmit the post-correction machine accuracy 37 to the control unit 11 to perform the compensation data correction request when the application of the compensation data correction value 35 is determined to be necessary. With the second determination unit 24, the necessity of the compensation data correction can be determined in the machine side, thus allowing to support the automatization.

The data analyzer 32 includes a data deficiency and failure notification unit 38. The data deficiency and failure notification unit 38 notifies the data display unit 22 of the necessity of remeasurement when the accuracy analysis fails to be performed because of a deficiency or a failure in the accuracy data 12 and the compensation data 13.

When the post-correction machine accuracy 37 indicated by the graph 119 of FIG. 3 is not so much improved, an execution button 122 in a column of an accuracy adjustment work request 118 as an accuracy adjustment work request unit 25 disposed in the second data communication unit 21 is pressed. Then, a manufacturer or the like accepting the accuracy adjustment work request selects adjustment work possible dates 41 by an accuracy adjustment acceptance unit 40, and indicates reservable dates (check marks) in a calendar 126 on an accuracy adjustment work request screen 123 illustrated in FIG. 4. An accuracy adjustment request date 124 is also displayed on the accuracy adjustment work request screen 123.

Figure 4:
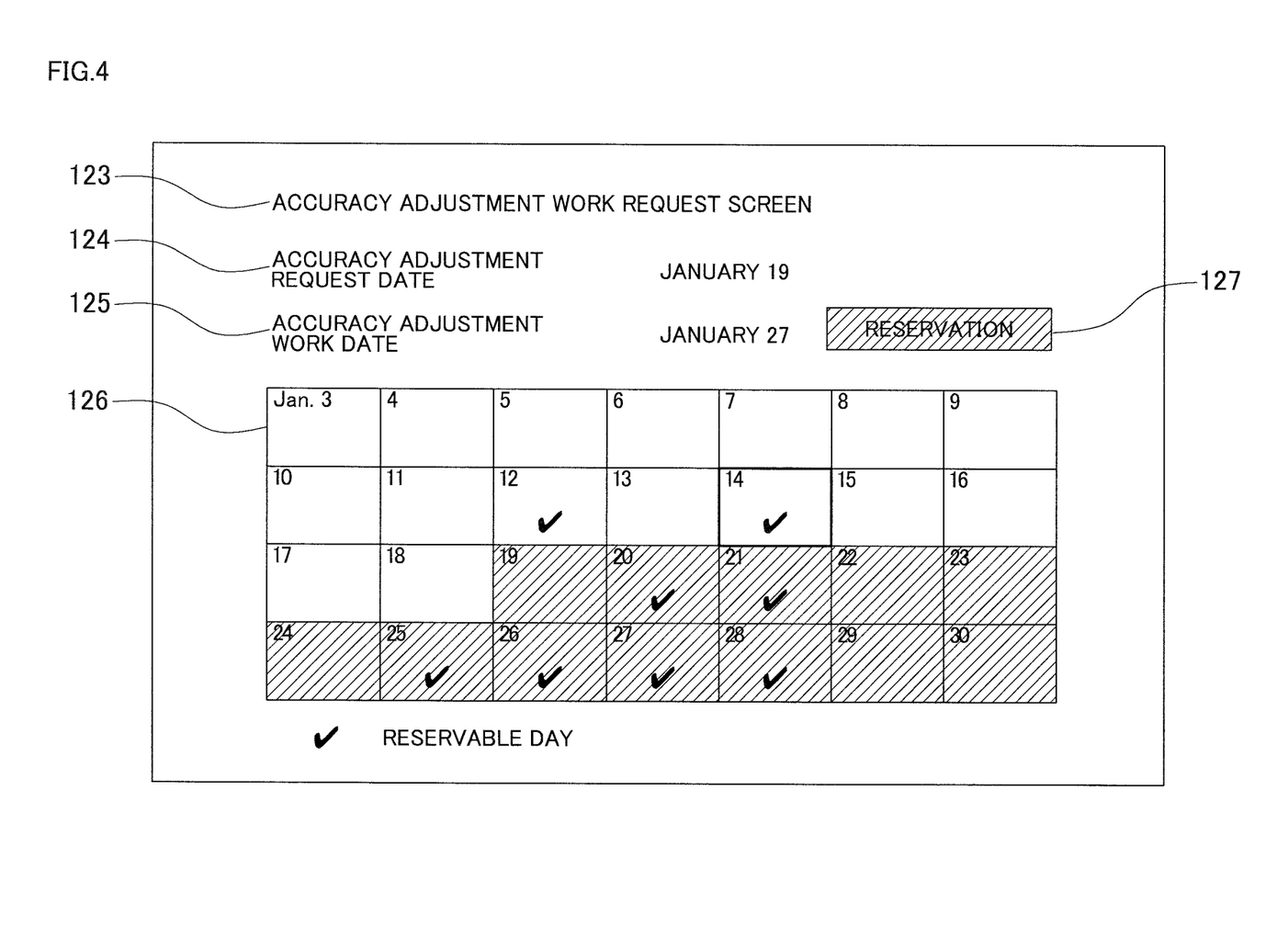
FIG. 4 illustrates an example of an accuracy adjustment work request screen.

The user inputs a desired accuracy adjustment work date 125 among the reservable dates, and presses a reservation button 127 as a reservation unit 26. Then, the accuracy adjustment work date 125 is notified to the accuracy adjustment acceptance unit 40, and the acceptance is completed.

Thus, with the accuracy adjustment work request unit 25, the correction work of the machine accuracy can be immediately requested, for example, when the correction of the compensation data is not effective.

As described above, the accuracy analysis system S of the double column machining center M having the above-described configuration includes the control unit 11, the data server 31, the first data communication unit 17 (data communication unit), the data analyzer 32, the corrected machine accuracy calculation unit 33, and the data display unit 22. The control unit 11 stores the preliminarily obtained accuracy data 12 regarding the machine accuracy of the double column machining center M, the compensation data 13 for compensating for the error based on the accuracy data 12, and the machine information 14 as information regarding the double column machining center M. The data server 31 stores the accuracy data 12, the compensation data 13, and the machine information 14. The first data communication unit 17 (data communication unit) transmits the accuracy data 12, the compensation data 13, and the machine information 14 in the control unit 11 to the data server 31. The data analyzer 32 uses the accuracy data 12 and the compensation data 13 in the data server 31 to obtain the compensation data correction value 35 as the correction value of the compensation data 13 and the expected accuracy data 36 when the compensation data correction value 35 is applied. The corrected machine accuracy calculation unit 33 calculates the post-correction machine accuracy 37 from the expected accuracy data 36. The data display unit 22 displays the post-correction machine accuracy 37 calculated by the corrected machine accuracy calculation unit 33.

With the configuration, the user can confirm the reduction degree of the machine accuracy and the machine accuracy after correcting the compensation data, correct the compensation data, and request the adjustment work of the machine accuracy. Accordingly, the time and the cost used for the unnecessary adjustment of the machine accuracy can be eliminated.

Especially, the data server 31 stores the accuracy data, the compensation data, and the machine information of a plurality of double column machining centers. The data analyzer 32 includes the machine information comparator 34 that compares the machine information of the plurality of double column machining centers in the data server 31. When obtaining the compensation data correction value 35 and the expected accuracy data 36 of the double column machining center M, the machine information comparator 34 obtains the compensation data correction value 35 and the expected accuracy data 36 of the double column machining center M by using the compensation data and the accuracy data of another double column machining center having the machine information determined to be highly correlated to the machine information 14 of the double column machining center M Thus, by performing the analysis from the data of a plurality of double column machining centers including the data of the machine information highly correlated to the machine information of the double column machining center M to be subjected to the analysis of the machine accuracy, the reliability of the compensation data correction value 35 and the expected accuracy data 36 can be enhanced even when the amount of the data on the double column machining center M as a target is small.

Figure 6:
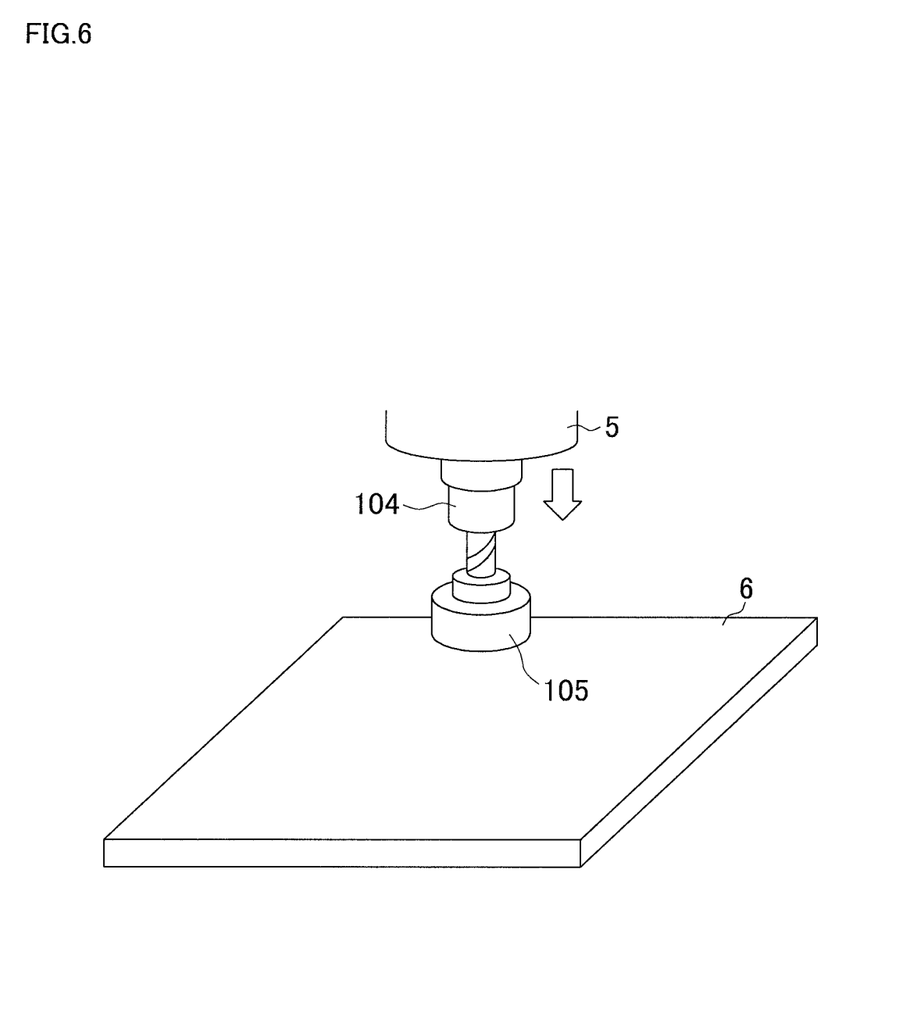
FIG. 6 illustrates an example of using a tool sensor.

The disclosure is not limited to the above-described embodiment, and the machine accuracy can be obtained for the straightness, the squareness, the thermal displacement of the machine, or the like as the target other than the positioning accuracy by changing the measurement method for the accuracy data. For example, in a method using a tool sensor 105 of FIG. 6, a tool 104 is attached to the main spindle 5, and a distal end position of the tool is regularly measured by the tool sensor 105, thereby allowing the measurement of the thermal displacement of the machine in the Z-direction.

While the two data communication units are disposed in the above-described configuration, the respective functions may be collected in only one data communication unit. In this case, the screens of FIGS. 2 and 3 may be simultaneously displayed on a split display, or may be individually displayed by switching in one data display unit.

The data analyzer may be configured to obtain and indicate the compensation data correction value and the expected accuracy data for only one machine tool by omitting the machine information comparator.

Further, the machine tool is not limited to the machining center, and may be a multitasking machine or other dedicated processing machines.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. An accuracy analysis system for a machine tool, comprising:

the machine tool that has a control unit and a data communication unit, the control unit stores preliminarily obtained accuracy data regarding a machine accuracy of the machine tool, compensation data for compensating for an error based on the preliminarily obtained accuracy data, and machine information as information regarding the machine tool; the data communication unit transmits the preliminarily obtained accuracy data, the compensation data, and the machine information in the control unit to a data server;

the data server stores the preliminarily obtained accuracy data, the compensation data, and the machine information of a plurality of machine tools;

a data analyzer that uses the preliminarily obtained accuracy data and the compensation data in the data server to obtain a compensation data correction value as a correction value of the compensation data and expected accuracy data when the compensation data correction value is applied;

a corrected machine accuracy calculation unit that calculates a post-correction machine accuracy from the expected accuracy data; and a data display unit that displays the post-correction machine accuracy calculated by the corrected machine accuracy calculation unit, wherein the data analyzer includes a machine information comparator that compares the machine information of the plurality of machine tools in the data server with one another, and when obtaining the compensation data correction value and the expected accuracy data of a predetermined one of the machine tools, the machine information comparator obtains the compensation data correction value and the expected accuracy data of the predetermined one of the machine tools by using the compensation data and the preliminarily obtained accuracy data of another one of the machine tools having the machine information determined to be correlated to the machine information of the predetermined one of the machine tools, the accuracy analysis system for a machine tool, further comprising a machine accuracy calculation unit that calculates the machine accuracy of the machine tool from the preliminarily obtained accuracy data of the control unit, wherein the data communication unit further includes:
a second data display unit that displays the machine accuracy calculated by the machine accuracy calculation unit; and
a communication execution selection unit that selects whether to perform a transmission to the data server; and wherein a user of the predetermined one of the machine tools requests the control unit to apply the compensation data correction value when a comparison between the machine accuracy before-correction and the post-correction machine accuracy is acceptable, and requests adjustment work of the machine accuracy of the predetermined one of the machine tools when the comparison is not acceptable.

2. The accuracy analysis system for a machine tool according to claim 1, wherein
the data display unit displays at least one of a graph indicating the post-correction machine accuracy calculated by the corrected machine accuracy calculation unit, a quality determination result of the post-correction machine accuracy, an effectivity of the compensation data correction value, and a necessity of a machine accuracy adjustment work.

3. The accuracy analysis system for a machine tool according to claim 1, wherein
the second data display unit displays at least one of a graph indicating the machine accuracy calculated by the machine accuracy calculation unit, a quality determination result of the machine accuracy, and a necessity of a machine accuracy correction.

4. The accuracy analysis system for a machine tool according to claim 1, further comprising
a second data communication unit that transmits the compensation data correction value and the expected accuracy data from the data analyzer to the control unit, wherein
the second data communication unit includes a second communication execution selection unit that selects whether to perform the transmission from the data analyzer to the control unit.

5. The accuracy analysis system for a machine tool according to claim 1, wherein
the accuracy data of the control unit includes a measurement position, a command position, and temperatures at a predetermined portion of the machine tool in a preliminarily set machine operation.

6. The accuracy analysis system for a machine tool according to claim 5, wherein
the measurement position is a position of an object obtained by a position measurement sensor or a position of a distal end of a tool obtained by using a tool sensor.

7. The accuracy analysis system for a machine tool according to claim 1, further comprising:
an accuracy adjustment work request unit configured to request an accuracy adjustment work; and
an accuracy adjustment acceptance unit that determines adjustment work possible dates based on the request of the accuracy adjustment work from the accuracy adjustment work request unit, and indicates the adjustment work possible dates to the accuracy adjustment work request unit, wherein
the accuracy adjustment work request unit includes a reservation unit configured to select an accuracy adjustment work date from the adjustment work possible dates and make a reservation.

* * * * *